Patented May 25, 1943

2,319,876

UNITED STATES PATENT OFFICE 2,319,876

PREPARATION OF AROMATIC SULPHON-AMIDE - PHENOL - DIHALIDE REACTION PRODUCTS

William Henry Moss, London, England, assignor to Celanese Corporation of America, a corporation of Delaware No Drawing. Application November 23, 1938, Serial No. 242,024. In Great Britain December 4, 1937

10 Claims. (Cl. 260—61)

This invention relates to a new class of chemical compounds and to the use of compounds of this class, for instance as modifiers for incorporation in compositions of matter, especially those containing a cellulose ester or ether.

The new compounds of the invention are made by reacting together an aromatic sulphonamide, a compound containing at least two halogen atoms attached to different carbon atoms of an aliphatic grouping, and a phenol. Thus valuable synthetic resins may be produced by reacting together di-(4-hydroxyphenyl)-dimethyl-methane, para-toluene sulphonamide and symmetrical glycerol dichlorhydrin.

Preferably the phenol is a compound of the formula

where $R_1$ and $R_2$ are unsubstituted or nuclear substituted phenylol groups, $R_3$ is hydrogen or a lower alkyl, aralkyl or aryl group and $R_4$ is hydrogen or a lower alkyl group. Especially suitable are compounds of this formula in which $R_1$ and $R_2$ are unsubstituted or nuclear alkyl substituted p-phenylol groups.

The reaction may suitably be effected in the presence of an alkaline substance, for instance by dissolving the phenol and the sulphonamide in aqueous caustic soda or other alkaline solution, and heating the solution with the halide. All the halide to be employed is conveniently added at the same time. Where a halohydrin is employed, the phenol and sulphonamide are suitably dissolved in an alkaline solution containing the amount of caustic soda or other alkali theoretically required to react with the halohydrin. The reaction may be effected in the presence or absence of catalysts. The mixture of reagents is suitably heated under reflux until, and for some hours after, the resin begins to appear, after which the resin is separated, washed first with acidified water and then with unacidified water, and finally fused. Equimolecular or other proportions of the reactants may be employed, and the properties of the synthetic resin produced depends upon the proportions. When, for instance, substantially equimolecular proportions of di-(4-hydroxyphenyl)-dimethyl-methane or a similar diphenylol compound, para-toluene sulphonamide and symmetrical glycerol dichlohydrin are dissolved in aqueous caustic soda and heated at about 100° C. for about seven hours under reflux, the product is a hard, clear, light yellow, light-fast resin compatible with cellulose acetate and of good water-resistance, and is soluble in acetone, alcohol and benzene. By increasing the proportion of the phenol and/or decreasing that of the sulphonamide, resins of good water-resistance but of lower compatibility with cellulose acetate can be obtained. Thus, for example, a resin of good water-resistance can be obtained when the proportions are approximately 2 molecular proportions of the diphenylol compound, 1 molecular proportion of para-toluene sulphonamide and 1.5 molecular proportions of symmetrical glycerol dichlorhydrin. The sulphonamide, halohydrin and the phenol may also be used in the molecular proportions of 1:2:1. In general, the compatibility with cellulose acetate of the resins appears to depend upon the proportion of the para-toluene sulphonamide or other sulphonamide, and as this proportion increases the compatibility with cellulose acetate increases. Similarly, as the proportion of di-(4-hydroxyphenyl)-dimethyl-methane or other phenol increases the water-resistance of the product increases.

Thermo-setting resins can be produced by the process of the invention, for example by reacting together about equimolecular proportions of the diphenylol compound and the sulphonamide with about double molecular proportions of symmetrical glycerol dichlorhydrin. If reactants in these proportions, dissolved in aqueous caustic soda, are caused to react for a short time, e. g. for one hour under reflux at about 100° C., the product is a resin soluble in acetone, alcohol and benzene, while if the reaction is allowed to proceed for a longer period, e. g. for seven hours, the solubility of the product in these liquids decreases.

Synthetic resins may similarly be prepared from phenols other than di-(4-hydroxyphenyl)-dimethyl-methane, for instance from other phenols containing two hydroxyphenyl groups attached to an aliphatic grouping, e. g. di-(4-hydroxyphenyl)-methyl-methane, di-(4-hydroxyphenyl)-ethyl-methane, di-(4-hydroxyphenyl)-propyl-methane, di-(4-hydroxyphenyl)-dipropyl-methane, di-(4-hydroxyphenyl)-methyl-ethyl-methane, 1,1-di-(4-hydroxyphenyl)-cyclohexane and di-(4-hydroxyphenyl-phenyl-methane. Other phenols containing two or more phenolic hydroxyl groups, for instance resorcinol and 4,4'-dihydroxy-diphenyl, are suitable, as are monohydric phenols, for instance phenol itself, ortho- meta- and para-cresols, α and β naphthols, ortho- and para-tertiary amyl phenols and 1-3-5 xylenol. Resins produced from such mono-hydric phenols are in general softer than those produced from di-(4-hydroxyphenyl)-dimethyl-methane. The methyl or other alkyl substitution products or the halogen substitution products of the above compounds are also suitable, for instance di-(4-hydroxy-3-methyl-phenyl)-dimethyl-methane, di-(4-hydroxy-3,5-dimethylphenyl)-dimethyl-methane, di-(4-hydroxy-3-methyl-5-chlorphenyl)-dimethyl-methane, di-(4-hydroxy-3-5-dichlorphenyl)-methyl-methane, di-(4-hydroxy-3-5-dichlorphenyl)-dimethyl methane, di-(4-hydroxy-3-5-dichlorphenyl)-ethyl-methane, di-(4-hydroxy-3-5-dichlorphenyl)-methyl-ethyl-methane, di-(4-hydroxy-3-5-dichlorphenyl)-propyl-methane and corresponding bromine derivatives. The compounds may contain halogen atoms in aliphatic side chains, e. g. in the methyl, ethyl or propyl groups of the compounds referred to above.

As already indicated, the aromatic sulphonamide may contain a single ring, as for example in benzene sulphonamide and the toluene and xylene sulphonamides. The ortho- and para-toluene sulphonamides are especially suitable. On the other hand, the sulphonamide may contain more than one ring, as for example in the naphthalene sulphonamides. The aromatic sulphonamide may be substituted in the aromatic nucleus, for example by alkyl groups, e. g. methyl or ethyl groups, acidylamino groups, hydroxy groups or halogen atoms or other atoms or groups, or may be unsubstituted. One of the hydrogen atoms of the amino group of the sulphonamide may be substituted, for example by an alkyl group, as for instance in ethyl toluene sulphonamide, or by an aralkyl group.

Any suitable aliphatic halide may be employed, for instance a di- or poly-halide, e. g. an alkylene halide such as amylene dichloride or substituted oxy-compounds such as $\beta\beta'$-dichlor-diethyl ether and dichlor acetone. The di- or poly-halide may be partly or completely replaced by a mono-halide.

A di- or poly-halogen hydrin is, however, to be preferred, and examples of suitable di- and poly-halogen hydrins are symmetrical glycerol dichlorhydrin, asymmetrical glycerol dichlorhydrin, and dichlor derivatives of secondary butyl alcohol.

The synthetic resins prepared according to the invention may be moulded, dissolved in volatile solvents to form lacquers, varnishes or other coating compositions, or employed in other ways. The invention includes compositions containing the resins, for instance compositions containing a film-forming substance and a resin compatible therewith produced according to the process of the invention. Among film-forming materials that can be used are nitrocellulose, organic esters of cellulose, for instance cellulose acetate, cellulose formate, cellulose propionate and cellulose butyrate, and cellulose ethers, for instance methyl cellulose, ethyl cellulose and benzyl cellulose, and vinyl resins, e. g. polymerised vinyl acetate.

The synthetic resins of the invention may be incorporated with the cellulose esters, cellulose ethers and other materials in any convenient manner. Thus for example the resin may be incorporated in a solution of a cellulose derivative in a volatile solvent and the solvent evaporated, if a solid product is required. The resin may be worked up mechanically with the cellulose derivative in conjunction with a small quantity of a volatile solvent for the resin and for the cellulose derivative. Again the resin may be absorbed by a cellulose derivative directly from a solution or dispersion of the resin or by precipitation of the resin on to the finely divided cellulose derivative from a solution of the resin.

The compositions of matter produced by combining the synthetic resins of the present invention with cellulose esters, cellulose ethers and other materials may be in liquid or solid form and may be utilised for a large number of purposes. Solutions of cellulose esters or ethers containing the resins of the invention in volatile solvents, such for example as acetone, with or without other substances, such for example as plasticisers, medium or high boiling solvents, other resins whether natural or synthetic, fire-retardants, effect materials and the like, may be employed as lacquers, varnishes, adhesives or other coating or impregnating compositions, e. g. for the protection of rubber and other insulation and for insulating purposes generally. Solutions containing cellulose esters or ethers and the resins of the invention in volatile solvents may also be deposited on a smooth surface, such for example as the surface of a travelling band or the like, and the volatile solvent evaporated or otherwise removed so as to form foils or films. Again, the solutions may be extruded into an evaporative atmosphere or into a precipitating bath and artificial filaments formed. Solutions containing cellulose esters or ethers and the resins of the invention and also colouring materials may be employed as inks for printing plastic materials such as cellulose acetate film. Owing to the water-resistant properties of the resins of the invention, solutions containing cellulose derivatives and the resins are particularly suitable for use as aeroplane fabric dopes enabling the production of an aeroplane fabric which does not lose tautness when exposed to humid conditions. A suitable aeroplane dope is one containing cellulose acetate, a resin compatible therewith prepared according to the invention, and aluminium powder.

Compositions containing the synthetic resins of the invention and film-forming materials such as cellulose acetate may contain any suitable proportion of the resin, for instance up to 20, 40, 50 or 100% of the weight of the cellulose acetate or other film-forming material present or even more. The compositions may also contain other resins, plasticisers, pigments, dyes, effect materials and other substances.

Moulding powders and other solid compositions containing the synthetic resins of the invention may be moulded by pressure, injection or other moulding processes to form articles, or the compositions may be worked up into sheets suitable for use as the reinforcing material in splinterless glass, for example, or into rods, tubes or blocks.

The synthetic resins of the invention are valuable for increasing the resistance to creasing of textile materials containing, for instance, cotton, regenerated cellulose, cellulose acetate or other cellulose derivatives. One method of fixing the synthetic resin in the textile material is first to apply the di-(4-hydroxyphenyl)-dimethyl-methane or similar substance and the aromatic sulphonamide to the material and then to apply the halogen hydrin or other halide. Cellulose acetate fabric, for instance, may be rendered crease-resisting by first applying to the fabric di-(4-hydroxyphenyl)-dimethyl-methane and para-toluene sulphonamide, for instance in a mildly alkaline solution, and then applying symmetrical glycerol dichlorhydrin. The di-(4-hydroxyphenyl)-dimethyl-methane and para-toluene sulphonamide may if desired be applied in aqueous pyridine solution, in which case the pyridine combines with the hydrogen chloride liberated when the condensation with the glycerol dichlorhydrin takes place. Cotton, linen, regenerated cellulose and other textile materials can be treated in a similar manner.

The following examples, in which all the proportions are by weight, illustrate the invention.

*Example 1*

A thermosetting synthetic resin soluble in acetone, alcohol and benzene is made by dissolving 228 parts of diphenylol propane crystals and 171 parts of para-toluene sulphonamide in about 2000 parts of an 8% solution of caustic soda, adding 258 parts of symmetrical glycerine dichlorhydrin and heating the mixture under reflux for 1 hour. Heating the mixture for a longer period than 1 hour progressively decreases the solubility in acetone, alcohol and benzene of the resin produced.

*Example 2*

A synthetic resin soluble in acetone, alcohol and benzene and having a melting point of about 53° C. is produced by dissolving 228 parts of diphenylol propane crystals and 171 parts of para-toluene sulphonamide in about 1000 parts of an 8% aqueous solution of caustic soda, adding 129 parts of symmetrical glycerine chlorhydrin, heating the mixture under reflux for 7 hours, washing and fusing the resinous product.

*Example 3*

A clear lacquer for wood has the following composition:

| | Parts |
|---|---|
| Cellulose acetate | 20 |
| Synthetic resin obtained according to Example 2 | 20 |
| Ethyl toluene sulphonamide | 10 |
| Acetone | 64 |
| Ethyl alcohol | 32 |
| Benzene | 36 |
| Ethyl lactate | 25 |

The ethyl toluene sulphonamide may be replaced by diethyl phthalate. If a pigmented lacquer be required, 5 parts of titanium oxide may be added.

*Example 4*

A moulding powder has the following composition:

| | Parts |
|---|---|
| Cellulose acetate | 100 |
| Synthetic resin obtained according to Example 2 | 30 |
| Dimethyl phthalate | 30 |

The resin and the dimethyl phthalate are incorporated in the cellulose acetate by first dissolving in alcohol, spraying the resulting solution over the cellulose acetate and working the mixture on rolls.

*Example 5*

A solution suitable for spinning artificial silk or for the production of thin films or foils has the composition:

| | Parts |
|---|---|
| Cellulose acetate | 100 |
| Synthetic resin made according to Example 2 | 20 |
| Acetone | 350–400 |

*Example 6*

A composition suitable for use as an ink on cellulose acetate films and like materials is:

| | Parts |
|---|---|
| Cellulose acetate | 160 |
| Synthetic resin made according to Example 2 | 80 |
| Triacetin | 500 |
| Methyl ethyl ketone | 100 |
| Diacetone alcohol | 360 |
| Helio red | 400 |

By reducing the amount of triacetin to 250 parts, an ink suitable for paper is produced.

*Example 7*

A composition suitable for use as an adhesive for cellulose acetate, leather and the like is constituted as follows:

| | Parts |
|---|---|
| Cellulose acetate | 100 |
| Synthetic resin made according to Example 2 | 125 |
| Triacetin | 30 |
| Methyl ethyl ketone | 300 |
| Acetone | 100 |

The triacetin can be replaced by an equal quantity of the substance sold under the registered trade-mark "Glyacon."

*Example 8*

A crease-resisting finish is imparted to a fabric of cellulose acetate artificial silk as follows:

A synthetic resin is made according to Example 1, the heating being stopped while the product is still soluble in alcohol.

A solution of the resin in alcohol is then made and the fabric is immersed in the solution. It is then dried at ordinary temperature and subsequently heated for a few minutes at a temperature of 110–130° C. It is then washed and dried.

The resistance to creasing of textile materials can also be increased by incorporating therein a synthetic resin prepared from a phenol such as di-(4-hydroxyphenyl)-dimethyl-methane and a halide of the type employed according to the present invention, or from an aromatic sulphonamide and a halide of the above type. Thus the resistance to creasing of fabric containing cellulose acetate, cotton, linen, regenerated cellulose or other yarns may be improved by first incorporating in the fabric either di-(4-hydroxyphenyl)-dimethyl-methane or para-toluene sulphonamide, and then applying symmetrical glycerol dichlorhydrin to the fabric.

Having described my invention what I desire to secure by Letters Patent is:

1. Process for the production of new chemical compounds which comprises reacting together an aromatic sulphonamide, a compound containing at least two halogen atoms attached to different carbon atoms of alkylene groups, and a phenol.

2. Process for the production of new chemical compounds which comprises reacting together an aromatic sulphonamide, a compound containing at least two halogen atoms attached to different carbon atoms of alkylene groups and a compound of the formula

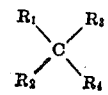

where $R_1$ and $R_2$ are selected from the class consisting of unsubstituted and nuclear substituted phenylol groups, $R_3$ is selected from the class consisting of hydrogen and lower alkyl, aralkyl and aryl groups and R4 is selected from the class consisting of hydrogen and lower alkyl groups.

3. Process for the production of new chemical compounds which comprises reacting an aromatic sulphonamide, a symmetrical glycerine dihalohydrin and a compound of the formula

where $R_1$ and $R_2$ are selected from the class consisting of unsubstituted and nuclear substituted phenylol groups, $R_3$ is selected from the class consisting of hydrogen and lower alkyl, aralkyl and aryl groups and $R_4$ is selected from the class consisting of hydrogen and lower alkyl groups.

4. Process for the production of new chemical compounds which comprises reacting together paratoluene sulphonamide, symmetrical glycerine dichlorhydrin and diphenylol propane.

5. Process for the production of new chemical compounds which comprises reacting together paratoluene sulphonamide, symmetrical glycerine dichlorhydrin and diphenylol propane, the sulphonamide, the halohydrin and the phenol being present in the reaction mixture in the molecular proportions of 1:2:1 respectively.

6. Process for the production of new chemical compounds which comprises reacting together paratoluene sulphonamide, symmetrical glycerine dichlorhydrin and diphenylol propane, the sulphonamide, the halohydrin and the phenol being present in the reaction mixture in substantially equimolecular proportions.

7. Process for the production of new chemical compounds which comprises reacting together under alkaline conditions an aromatic sulphonamide, a compound containing at least two halogen atoms attached to different carbon atoms of alkylene groups, and a phenol.

8. Process for the production of new chemical compounds which comprises reacting together under alkaline conditions paratoluene sulphonamide, symmetrical glycerine dichlorhydrin and diphenylol propane.

9. Process for the production of new chemical compounds which comprises reacting together under alkaline conditions paratoluene sulphonamide, symmetrical glycerine dichlorhydrin and diphenylol propane, the sulphonamide, the halohydrin and the phenol being present in the reaction mixture in the molecular proportions of 1:2:1 respectively.

10. Process for the production of new chemical compounds which comprises reacting together under alkaline conditions paratoluene sulphonamide, symmetrical glycerine dichlorhydrin and diphenylol propane, the sulphonamide, the halohydrin and the phenol being present in the reaction mixture in substantially equimolecular proportions.

WILLIAM HENRY MOSS.